United States Patent [19]
Goldstein et al.

[11] 3,978,325
[45] Aug. 31, 1976

[54] ELECTRONIC THERMOMETER
[75] Inventors: Harold Goldstein, Westbury; William Montren, Bay Shore, both of N.Y.
[73] Assignee: Control Electronics Co., Inc., Farmingdale, N.Y.
[22] Filed: Sept. 5, 1973
[21] Appl. No.: 392,961

[52] U.S. Cl. ............................ 235/151.3; 73/339 R; 73/359 R; 128/2.1 R
[51] Int. Cl.² ...................... G01V 1/28; G01K 7/02
[58] Field of Search ........... 235/151.3; 73/359, 360, 73/341, 342, 362, 339; 128/404, 2.1; 338/22 R; 340/347 AD

[56] References Cited
UNITED STATES PATENTS

| | | | |
|---|---|---|---|
| 2,922,304 | 1/1960 | Lees et al. | 73/359 |
| 3,568,181 | 3/1971 | Weaver | 73/359 |
| 3,609,728 | 9/1971 | Quinn et al. | 340/347 AD |
| 3,665,169 | 5/1972 | Henderson et al. | 235/151.3 |
| 3,731,072 | 5/1973 | Johnston | 235/151.3 |
| 3,732,732 | 5/1973 | Trethewey | 73/359 |
| 3,878,224 | 4/1975 | Allen | 73/359 |

FOREIGN PATENTS OR APPLICATIONS
1,108,478  4/1968  United Kingdom.............. 235/151.3

Primary Examiner—Charles E. Atkinson
Assistant Examiner—Errol A. Krass
Attorney, Agent, or Firm—Jay H. Maioli

[57] ABSTRACT

An electronic apparatus to measure temperature which provides an accurate final temperature reading prior to the actual stabilization of the temperature sensor. An algorithm is provided which allows taking only two sensor temperature measurements at preselected times yet accurately predicts the sensor final or stabilization temperature. Temperature resistance varying signals are converted to temperature-frequency varying signals, clocked into an up/down counter, to compute final temperature which is displayed digitally. A thirty-second timing sequence is also digitally displayed for use when the invention is utilized for medical applications.

15 Claims, 3 Drawing Figures

ELECTRONIC THERMOMETER

BACKGROUND OF THE INVENTION

This invention relates generally to improvements in electronic thermometer devices, and more particularly to electronic thermometers which will provide accurate and reliable temperature measurements which may be obtained without waiting for the temperature sensing unit to reach its stabilization point.

One of the primary measurements made in medicine is the measurement of the body's temperature. This measurement was historically made using a glass bulb mercury thermometer which is still used extensively despite obvious drawbacks. More recently, however, with the advent of sophisticated electronics, electronic thermometers have been developed. These instruments use thermocouples or thermistors as the temperature sensing device and then amplify and otherwise process the signal to provide an analog or digital readout. These devices have generally been rather bulky and cumbersome. Furthermore, they have been rather slow. This is due to the fact that temperature sensing unit require a rather long time to stabilize at the final temperature. Attempts have been made to alleviate this problem by using various schemes involving the anticipation of the final stabilized temperature.

It is therefore an object of the present invention to provide an electronic temperature measuring device which will accurately predict a stabilized temperature in a relatively short period of time.

It is a further object of the invention to provide a rapid output electronic temperature sensing instrument for use in the medical arts.

It is still a further object of the invention to provide a digital temperature display at a time prior to the temperature sensing instrument stabilization time.

It is another object of the present invention to provide apparatus producing a digital time display followed by a digital temperature display which is in anticipation of the final stabilized temperature.

SUMMARY OF THE INVENTION

The present invention provides apparatus to rapidly and accurately measure temperature without the necessity of waiting for a sensing instrument to reach a stabilized state. In order to accomplish such rapid temperature measurements, it is desirable to take the fewest possible sensor temperature samples. Obviously, one sensor temperature measurement representing a given instant will not be sufficient to predict a final stabilized sensor temperature. The present invention provides an algorithm and attendant computing apparatus sufficient to require that only two sensor temperature measurements to be taken. The algorithm of the invention recognizes that the response curve of a temperature sensing unit such as a thermistor as it gains or loses heat may be expressed as an exponential function in terms of the initial and final temperature values. This algorithm is useful generally because manufacturers of thermistors try very hard to obtain the exact resistance response curve for all devices of the same type. Upon solution of the algorithm of the present invention it is found that only two thermistor temperature measurements which represent instantaneous resistance are required. These two samples or measurements, however, must be made precisely at specified times, these times are determined by the thermal time constant of the particular type of thermistor in use. Once it is recognized that only two temperature measurements need be made, and the exact timing of these measurements is known then this information may be fed to a special purpose computer. Such computer, provided by the invention, then processes the measurement signals and produces a digital readout of the exact final temperature the thermistor will attain at a time well before the thermistor has actually stabilized.

As is well known, a thermistor presents a varying resistance when confronted with a varying temperature. A varying resistance, however, is not the most convenient signal with which to work. Therefore, the invention provides an analog to digital convertor which receives the varying resistance signal as measured by voltage from a thermistor circuit or the like and converts it to a frequency varying signal as required by the algorithm components. This is accomplished by utilizing the resistance of the sensing instrument as a component of a resistor-capacitor controlled oscillator. In this way, as the resistance varies so will the frequency of oscillation of the oscillator. Furthermore, by choosing the frequency of oscillation such that it will be a multiple of the actual temperature under measurement then the predicted temperature may be more easily obtained. This frequency varying temperature-dependent signal is then processed according to the mathematical equation, which was devised by the algorithm as previously discussed. Upon solution of this equation the actual temperature measurement may be easily displayed digitally by use of light emitting diodes or the like. In accomplishing this signal processing and timing operation a second oscillator is required; this oscillator may then be used with the display devices already incorporated to display a timing signal which could be used for obtaining a patient's pulse. Thus the patient's pulse rate may be determined simultaneously with the same patient's temperature.

DESCRIPTION OF THE PREFERRED EMBODIMENT

Figure 1:
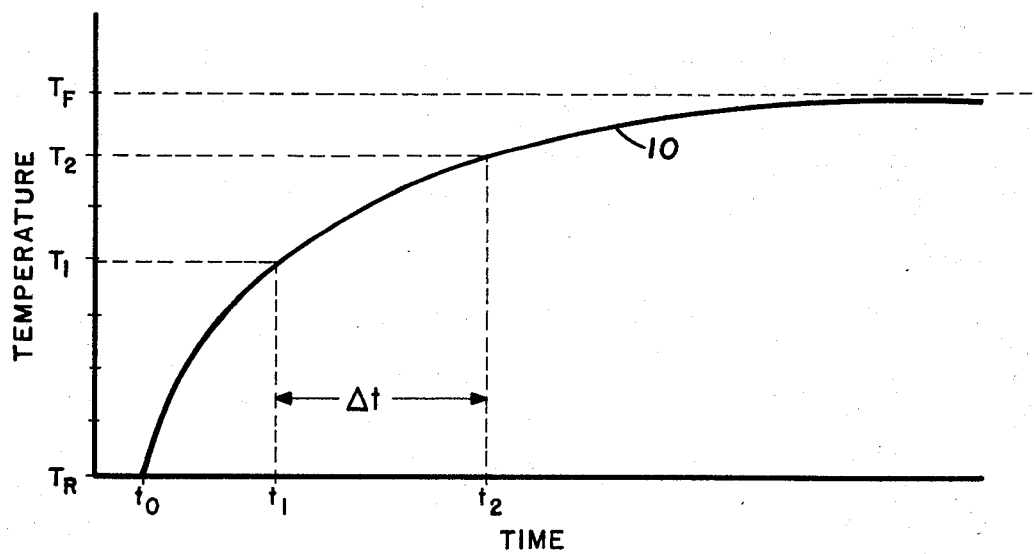
FIG. 1 is a characteristic curve of the temperature response of a typical thermistor temperature sensing unit.

Referring now to FIG. 1, a typical response curve of a temperature measuring instrument which utilizes a thermistor type sensing unit is shown. The ordinate axis T represents temperature. This response curve 10 is well known and is generally described as an exponential curve. A temperature at which the thermistor will be at rest is denoted as $T_R$, a first measured temperature is $T_1$, a second measured temperature $T_2$ and a final temperature $T_F$. The response curve will theoretically approach this $T_F$ value asymptotically and hence the time that this temperature ($T_F$) will be reached will be infinity. The time of the at rest temperature $T_R$ is denoted as $t_o$, while $t_1$ corresponds to the occurrence of the first temperature measurement $T_1$ and $t_2$ corresponds to the occurrence of the second temperature measurement $T_2$.

Any temperature T along the response curve 10, at some time $t$, will be given by the equation:

$$T = T_R + (T_F - T_R)(1 - e^{-t/\tau}) \quad 1.$$

where $\tau$ represents the thermal time constant of the particular thermistor under consideration. If we write this equation (1) for the two temperature measurements $T_1$, and $T_2$, then solve for the final temperature $T_F$, we have:

$$T_F = \frac{T_2 - (T_1) e^{-\frac{(t_2 - t_1)}{\tau}}}{1 - e^{-\frac{(t_2 - t_1)}{\tau}}} \quad 2.$$

by allowing $(t_2 - t_1)$ to be represented by $\Delta t$, as shown in FIG. 1, equation (2) becomes:

$$T_F = \frac{T_2 - T_1 e^{-\frac{\Delta t}{\tau}}}{1 - e^{-\frac{\Delta t}{\tau}}} \quad 3.$$

Since it is an objective of the invention to obtain a final temperature, without waiting for the sensing unit to stabilize, in the simplest manner possible, equation (3) should be solvable in the simplest manner also.

If we arbitrarily choose a value of $$e^{-\frac{\Delta t}{\tau}}$$

in order to allow equation (3) to be in its simplest form, we might choose 0.5, then:

$$e^{-\frac{\Delta t}{\tau}} = 0.5 \quad 4.$$

Having thus chosen the value in equation (4) we can then rewrite equation (3) as:

$$T_F = 2T_2 - T_1 \quad 5.$$

Rewriting equation (4) in different form yields $$e^{\frac{\Delta t}{\tau}} = 2 \quad 6.$$

and solving for $t$, $$\Delta t = t_2 - t_1 = \tau \ln 2 \quad 7.$$

A typical value for $\tau$ in a conventional thermistor might be 19 seconds. It is a simple matter to obtain the natural logarithm of 2 using tables, and then solving equation (7) for $\Delta t$ we have:

$$\Delta t = 0.693 (19 \text{ sec.}) \approx 13 \text{ sec.} \quad 8.$$

This means that the invention only requires a delay of 13 seconds between the first temperature measurement $T_1$, and the second temperature measurement $T_2$. Since the invention is intended for practical use, it has been found that upon the insertion of the thermistor probe into the patients body, the tissue surrounding the probe may be lowered in temperature momentarily by the lower temperature of the probe. Because of this it is advantageous to delay taking the first temperature measurement $T_1$. For the case just discussed where $\Delta t$ equals 13 seconds, a convenient delay time would be 17 seconds, thereby allowing the operational cycle to be 30 seconds, an ideal time in which to measure the patients pulse as discussed earlier.

Figure 2:
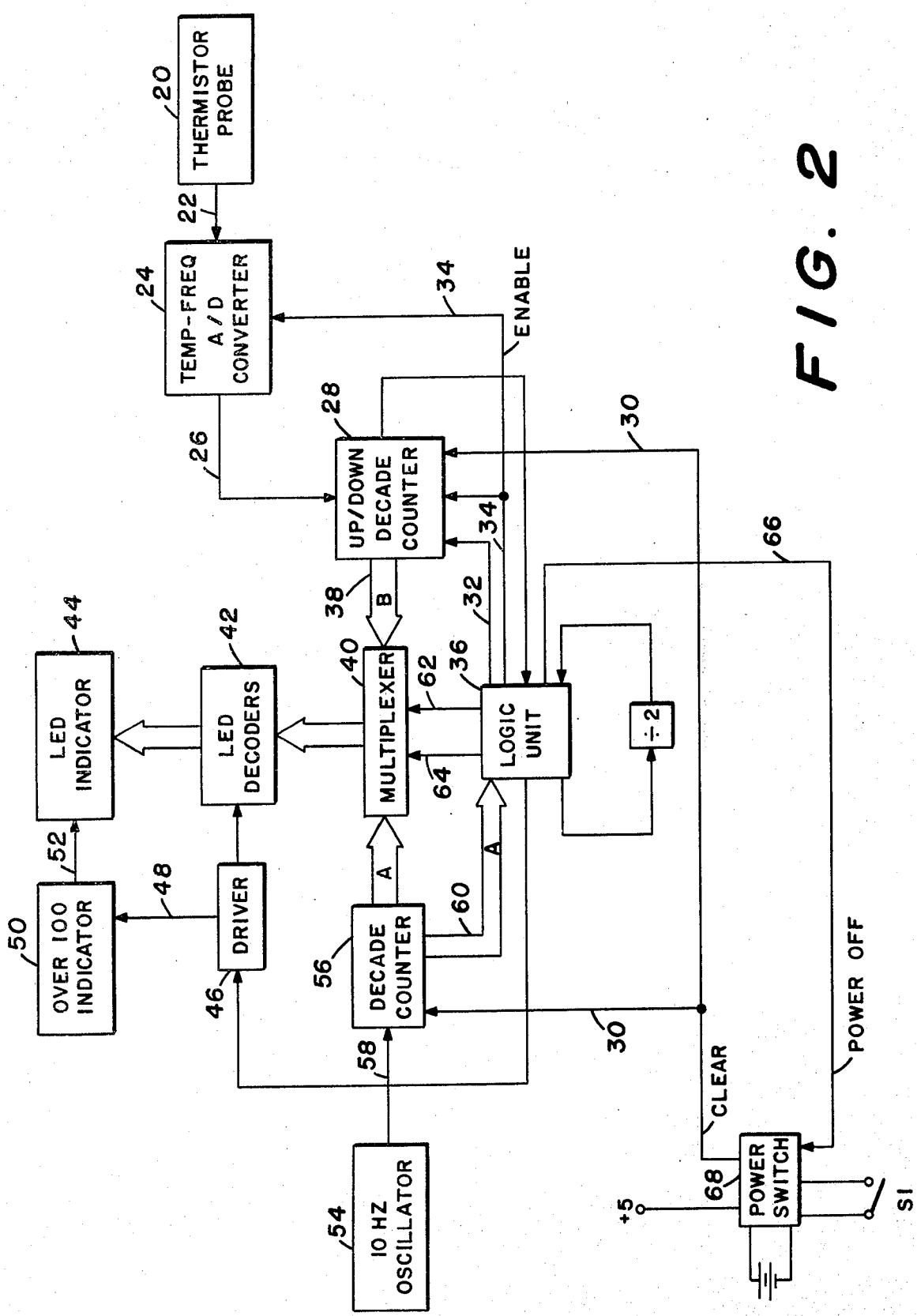
FIG. 2 is a block diagram of a preferred embodiment of electronic temperature measurement apparatus according to the present invention.

Referring now to FIG. 2, a preferred embodiment of the invention is shown in block diagram form. The thermistor probe 20 is inserted into the patient's body orally or rectally or otherwise, and produces a signal on line 22 which is fed to an analog-to-digital converter 24. This analog to digital converter 24, converts the signal to a frequency varying signal. This converter 24 will be shown in more detail hereinafter. This signal of varying frequency is fed on line 26 to an up/down decade converter 28. This up/down decade counter 28 is of the conventional type and will be used to perform the operation required by equation (5). The signal on line 26 from the converter 24 has a frequency which is equal to, or represents, ten times the temperature as measured by the probe 20, where the numerical value of the frequency in HZ is 10 times the numerical value of the temperature in degrees. Because of this the up/down decade counter 28 can be used to solve equation (5). When the counter 28 is cleared by a signal on line 30, to either all zeroes or all ones, and the counter is selected to be a down counter by a signal on line 32, upon the first temperature measurement being clocked into counter 28, the counter will count down the exact number of pulse which appear on line 26. The counter 28 and the analog to digital converter 24 are enabled for a preselected period of time, 1 sec, by an enable signal appearing on line 34. The enable signal is produced by a logic unit 36 which will be explained in further detail later. In order to solve equation (5) the first measurement $T_1$ must be subtracted from twice the value of $T_2$, upon this first use of the down counter the required subtraction has already been performed. A count-up signal now appears on line 32 from the logic unit 36, and a second temperature measurement $T_2$ on line 26 is counted up into counter 28. In order to accomplish the doubling of this measurement the signal on line 26 is allowed to enter the up-counter 28 for a time, 2 sec, defined by the enable signal on line 34, which is exactly two times the previously mentioned preselected time allowed for the down-counting function of the counter 28. In this way equation (5) is solved and the desired $T_F$ information is contained in the counter 28. This information is then fed by multichannel lines 38 to a multiplayer 40, which in a simple embodiment may comprise merely digital switches The information is fed through the multiplexer 40 to a conventional decoder 42 which is used to decode the signal for display by well known light emitting diodes digital display 44. The light emitting diode decoder 42 is driven by a conventional driver unit 46, which also produces a signal on 48 which is fed to a over one-hundred indicator 50. The over one-hundred indicator 50 may be a simple flip-flop and is used to produce a signal, fed to the light emitting diodes digital display 44 on line 52, which inhibits or blanks an indication of any numeral other than a "one" in the hundreds column. Since in this embodiment of the invention the measurement period is 30 seconds and it is desired to display this time for use in another clinical function, i.e. pulse taking, an oscillator 54 is required having a frequency of oscillation given by 10Hz. The oscillator 54 signal is clocked into a conventional decade counter 56 on line 58. The counter 56 has already been cleared by the clear signal on line 30 which was also used to clear the up/down counter 28. The oscillator 54 also provides the general timing signals for the required operations of the subject invention, and so the contents of the decade counter 56 are fed by multi-channel lines 60 to the logic unit 36. In order to obtain the thirty-second display on the light emitting diodes digital display 44 the oscillator 54 clock pulses are fed through the decade counter and into the multiplexer 40 on multi-channel lines.

The logic unit 36 may be of a conventional design and would consist of standard gating and logic circuits arranged so as to provide the timing function, blanking pulses, enable signals at the appropriate times and for the appropriate durations. The logic unit also controls the multiplex unit 40 by a signal on line 62 so that first the thirty-second timing count is displayed, then the temperature information as contained in the decade counter 28 is displayed. A one-second blanking pulse on line 64 is also provided to supply a brief interval between the display of the two types of information.

In addition another function of the logic unit 36 is to provide a power off signal on line 66, which is fed to the power switch 68. This signal is produced at the end of a preselected time period during which the display device 44 is displaying the temperature information. A momentary contact start switch 70 is used to trigger the power switch 68, which then produces the counter clear signal on line 30 and serves to start the temperature measuring cycle.

Figure 3:
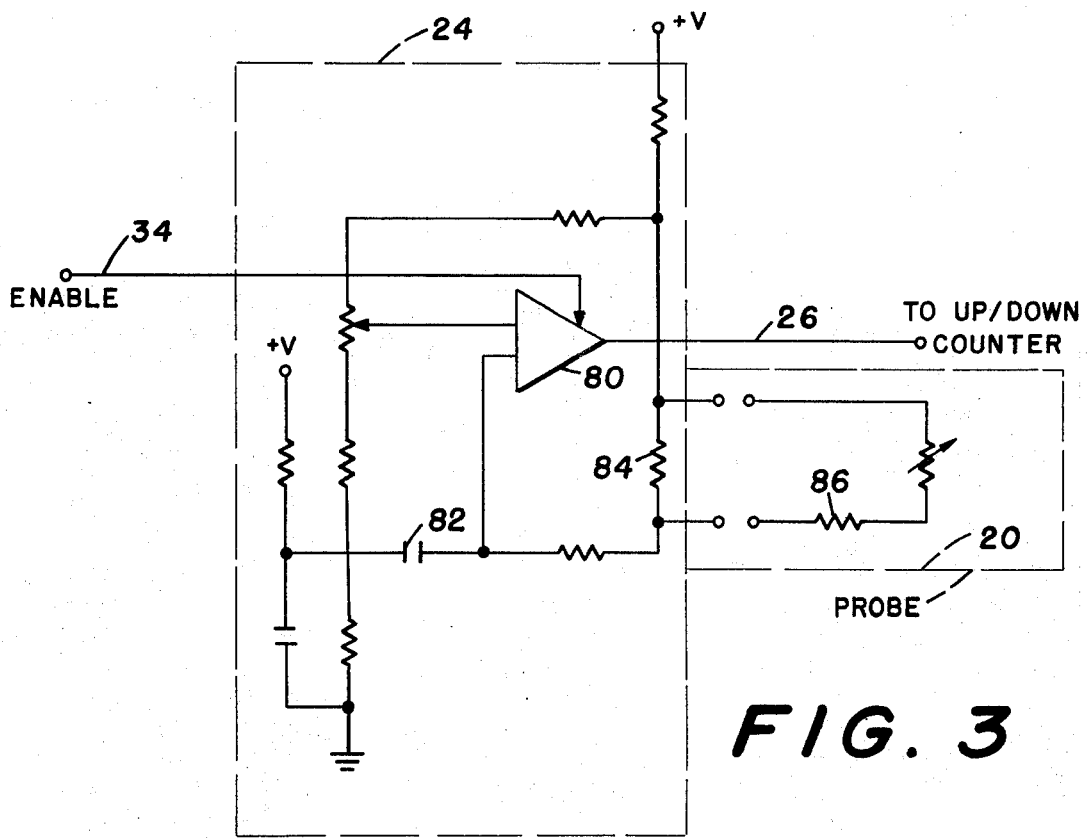
FIG. 3 is a schematic diagram of analog to digital converter as used in the preferred embodiment of the invention as shown in FIG. 2.

Referring now to FIG. 3, the analog-to-digital converter, 24 of FIG. 2, is shown in more detail. This converter is actually an oscillator whose frequency of oscillation, dependent on R and C, is varied by varying R. In this case, a conventional operational amplifier 80 is connected in the conventional manner to form a free running multivibrator, with the exception that the thermistor probe 20 is included in the feedback connection. The variable resistance presented by the thermistor probe 20 when it resonates with the capacitor 82 determines the frequency of oscillation. Additional resistors 84 and 86 are included in the thermistor 20 input circuit in order to balance the input impedance to allow different probes, say rectal and oral, to be used interchangeably. The converter 24 is enabled as was stated by an enable signal on line 34 from the logic unit 36. This unit 36 turns on the converter 24 for one second for the first temperature measurement $T_1$ and for 2 seconds for the second temperature measurement $T_2$.

It should be understood that the details of the foregoing embodiment are set forth by way of example only. Any type of thermistor probe may be utilized and the logic may comprise many well known forms. Accordingly, it is contemplated that this invention not be limited by the particular details of the embodiment as shown except as defined in the appended claims.

What is claimed is:

1. Electronic apparatus to measure temperature comprising:
    means for varying an electrical parameter representing the temperature being measured in accordance with a known delayed response, wherein said electrical parameter reaches a steady state value, said value being representative of a final temperature,
    means electrically connected to said parameter varying means for converting said electrical parameter to an alternating current signal during both a first and a second time period, the lengths of said time periods each being shorter than the time period required for said electrical parameter to reach said steady state value, and
    means for computing said final temperature by operating upon said alternating current signal converted during said first time period and said alternating current signal converted during said second time period before said electrical parameter reaches said steady state value.

2. The apparatus of claim 1 wherein the delay response of said parameter varying means, describes a decaying exponential curve.

3. The apparatus of claim 2 wherein said first time period and said second time period are of different lengths.

4. The apparatus of claim 3 wherein said second time period is twice the length of said first time period, wherein said second time period occurs after said first time period, and wherein the frequency of said alternating current signal during each of said time periods is an integral multiple of the magnitude of the instantaneous response of said parameter varying means during the respective time period.

5. The apparatus of claim 4 wherein said parameter varing means comprises a thermistor; wherein said converting means includes a free-running multivibrator having an operational amplifier with resistance-capacitance feedback control; said thermistor forming part of said resistance-capacitance feedback control; and wherein said computing means comprises an up-down decade counter driven by said multivibrator and logical timing circuitry, said circuitry controlling the operation of said multivibrator and said up-down decade counter.

6. The apparatus of claim 5 further comprising a digital display said display being driven by said decade counter and being controlled by said computer means timing circuitry to display only the computed temperature being measured.

7. Electronic thermometer apparatus comprising:
    sensor means for varying an electric parameter in accordance with a temperature being sensed said sensor means in varying said electric parameter has a known response delay described by an exponential curve wherein intermediary values of said electric parameter are produced before the final value of the electric parameter representative of the actual temperature being sensed is produced,
    means connected to said sensor means for converting said intermediary values of the electric parameter to alternating current signals,
    means for enabling said converting means at two preselected times, and
    means for computing said final value of the electric parameter representative of the actual temperature being sensed in accordance with said known exponential response curve by operating upon the alternating current signals converted at said two preselected times, wherein said computed final value is computed in advance of said sensor means reaching said final value.

8. The apparatus of claim 7 wherein said converting means comprises an oscillator having an R-C feedback control circuit said oscillator being connected to said enabling means and said computing means and wherein said sensor means includes a thermistor; said thermistor being connected to form part of said feedback control circuit of said oscillator.

9. The apparatus of claim 8 wherein said computing means comprises a digital counter circuit; said digital counter circuit being connected to said oscillator; and a digital display connected to be driven by said counter circuit.

10. The apparatus of claim 9 wherein said digital counter circuit comprises an up/down counter connected to said oscillator and to said digital display; and timing circuitry connected to said up/down counter and to said digital display to control the function and periods of operation of said up/down counter and of said digital display respectively.

11. The apparatus of claim 10 wherein said computing means in operating upon the alternating current signals performs the mathematical operation of two times the second of said two signals minus the first of said two signals.

12. A temperature computing circuit in an electronic thermometer comprising:

means for sensing a temperature condition and producing a signal representing said temperature condition, said signal being produced according to a known exponential delayed response curve whereby intermediate signals describing said curve are produced before the signal representing the actual temperature condition sensed is produced;

means connected to said sensing means and producing means for obtaining two of said intermediate signals and for computing said final signal which will be eventually produced before it is actually produced by said sensing and producing means, said computation involving a solution of said exponential curve using said two intermediate signals; and means connected to said computing means for displaying a temperature value in response to said computed signal.

13. The apparatus of claim 12 wherein said computing means comprises means for simplifying said solution of said exponential curve wherein said two intermediate signals are spaced apart approximately 13 seconds.

14. The apparatus of claim 13 wherein said simplified solution means comprises means for subtracting the first of said two intermediate signals from twice the second of said two intermediate signals.

15. The apparatus of claim 14 wherein said sensing and producing means comprises a thermistor and a free-running multivibrator having an operational amplifier with resistance-capacitance feedback control, said thermistor comprising the resistance portion of said feedback control; and wherein said means for sampling and computing includes an up/down decade counter driven by said multivibrator and logical timing circuitry, said timing circuitry controlling said multivibrator and said up/down counter.

* * * * *